United States Patent
Chen

(10) Patent No.: US 10,079,688 B2
(45) Date of Patent: Sep. 18, 2018

(54) NETWORK PORT AND ETHERNET DEVICE INTEGRATING POWERED DEVICE AND POWER SOURCING EQUIVALENT IN A PORT

(71) Applicant: HON HAI PRECISION INDUSTRY CO., LTD., New Taipei (TW)

(72) Inventor: Yu-Chia Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 299 days.

(21) Appl. No.: 14/826,402

(22) Filed: Aug. 14, 2015

(65) Prior Publication Data

US 2016/0087807 A1 Mar. 24, 2016

(30) Foreign Application Priority Data

Sep. 24, 2014 (TW) .............................. 103133117 A

(51) Int. Cl.
*G06F 1/26* (2006.01)
*H04L 12/10* (2006.01)

(52) U.S. Cl.
CPC .............. *H04L 12/10* (2013.01); *G06F 1/266* (2013.01)

(58) Field of Classification Search
CPC ................................ G06F 1/266; H04L 12/10
See application file for complete search history.

(56) References Cited

U.S. PATENT DOCUMENTS

| 7,363,525 | B2 | 4/2008 | Biederman et al. |
| 2006/0089230 | A1* | 4/2006 | Biederman ............. H04L 12/10 477/34 |
| 2006/0273661 | A1 | 12/2006 | Toebes et al. |
| 2011/0181125 | A1* | 7/2011 | Diab ..................... G06F 1/1632 307/116 |
| 2016/0064938 | A1* | 3/2016 | Balasubramanian ... H04L 12/10 307/11 |

FOREIGN PATENT DOCUMENTS

| CN | 102387022 A | 3/2012 |
| CN | 102664741 | 9/2012 |
| CN | 103067182 A | 4/2013 |
| WO | 2011123314 A1 | 10/2011 |

* cited by examiner

*Primary Examiner* — Kim Huynh
*Assistant Examiner* — Brandon Kinsey
(74) *Attorney, Agent, or Firm* — ScienBiziP, P.C.

(57) ABSTRACT

A network port includes a connection port, a PD unit, a PSE unit, a control unit, and a switch unit. The connection port is connected to an external Ethernet port. The control unit determines a type of the external Ethernet port and outputs determination signal correspondingly. The switch unit selectively connects the PSE unit to the connection port, or connects the PD unit to the connection port according to the determination signal output by the control unit. An Ethernet device is also provided. The network port and the Ethernet device integrate PD and PSE in a port, and switch to corresponding PSE mode or PD mode automatically according to the PSE device or PD device.

16 Claims, 5 Drawing Sheets

NETWORK PORT AND ETHERNET DEVICE INTEGRATING POWERED DEVICE AND POWER SOURCING EQUIVALENT IN A PORT

CROSS-REFERENCE TO RELATED APPLICATIONS

This application claims priority to Taiwanese Patent Application No. 103133117 filed on Sep. 24, 2014, the contents of which are incorporated by reference herein.

FIELD

The subject matter herein generally relates to network port, and particularly to Ethernet device that integrate a PD (Powered Device) and a PSE (Power Sourcing Equivalent) in a port.

BACKGROUND

A power over Ethernet (POE) system comprises a PD unit and a PSE unit. The PD function is separate from the PSE function. The PSE port supplies electric signal, and the PD unit receives electric signal.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the views.

DETAILED DESCRIPTION

Figure 1:
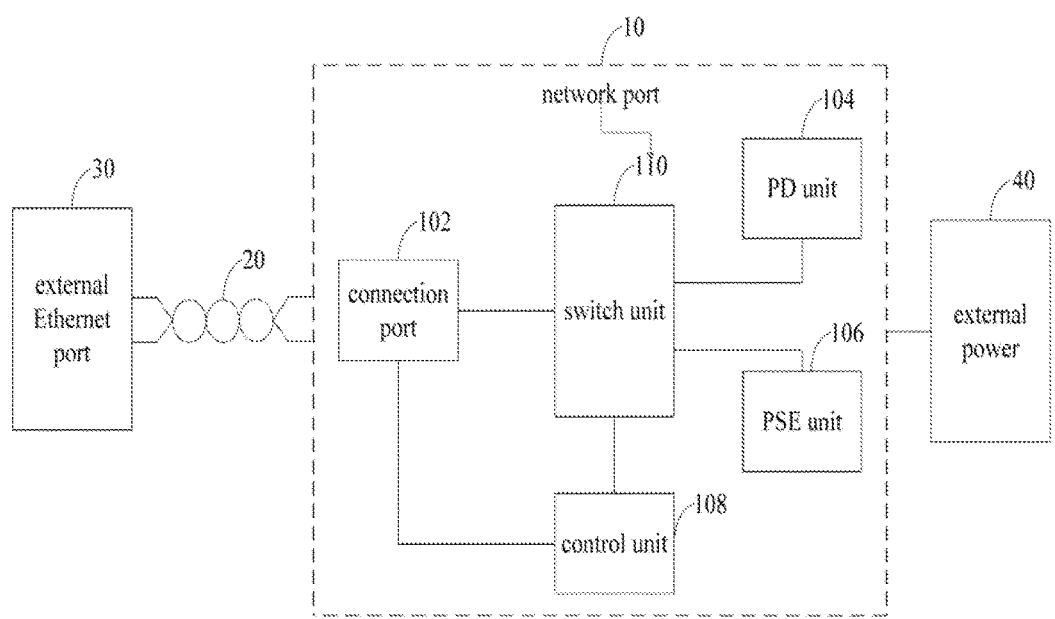
FIG. 1 is a diagram of a first embodiment of a network port.

The disclosure is illustrated by way of example and not by way of limitation in the figures of the accompanying drawings in which like reference numerals indicate similar elements. It should be noted that references to "an" or "one" embodiment in this disclosure are not necessarily to the same embodiment, and such references can mean "at least one."

FIG. 1 illustrates a first embodiment of a network port 10. In at least one embodiment, the network port 10 connects to an external Ethernet port 30 by a network cable 20. The external Ethernet port 30 may be a power sourcing equipment (PSE) port, and also may be a powered device (PD) port. The network port 10 comprises a PSE mode and a PD mode. When the network port 10 is in the PSE mode, the network port 10 outputs an electric signal to supply power to the PD port. When the network port 10 is in the PD mode, the network port 10 receives the electric signal. In at least one embodiment, the network cable 20 is an RJ45 twisted pair connection.

In at least one embodiment, the network port 10 comprises a connection port 102, a PD unit 104, a PSE unit 106, a control unit 108, and a switch unit 110. One end of the network port 10 is connected to the connection port 102, and the other end of the network port 10 is connected to the external Ethernet port 30.

When the network port 10 is in the PSE mode, the network port 10 receives the electric signal from an external power source supply 40 through the PSE unit 106 for outputting to the PD unit 104 connected to the network port 10. When the network port 10 is in the PD mode, the network port 10 receives the electric signal through the PD unit 104. The control unit 108 connected to the connection port 102 determines a type of the external Ethernet port 30 currently connected to the connection port 102. The control unit 108 outputs the determination signals correspondingly.

The switch unit 110 is connected to the connection port 102, the PD unit 104, the PSE unit 106, and the control unit 108. The switch unit 110 can select a connection to the PD unit 104 and the connection port 102 or can select a connection to the PSE unit 106 and the connection port 102, according to the determination signal output by the control unit 108. The network port 10 selects appropriate mode through the switch unit 110 to match the external Ethernet port 30, according to the type of the external Ethernet port 30.

In at least one embodiment, when the switch unit 110 connects the PSE unit 106 to the connection port 102, the PSE unit 106 determines whether the electrical signal to the external Ethernet port 30 is to be output or not according to the mode of the network port 10. When the switch unit 110 connects the PD unit 104 to the connection port 102, the PD unit 104 determines whether receives the electric signal output by the external Ethernet port 30 according to the mode of the network port 10.

The PSE unit 106 outputs the electric signal to the external Ethernet port 30 when the switch unit 110 connects the PSE unit 106 to the connection port 102, and the network port 10 is in the PSE mode. The PD unit 104 receives the electric signal from the external Ethernet port 30 when the switch unit 110 connects the PD unit 104 to the connection port 102, and the network port 10 is in the PD mode.

In at least one embodiment, the control unit 108 determines whether the network port 10 is switched to the PSE mode or to the PD mode or not by reading the information of the PSE enable pin and the PD enable pin, which are both located in the network port 10 to output either a first control signal or a second control signal.

The PSE unit 106 outputs the electric signal to the external Ethernet port 30 when the switch unit 110 is connected to the connection unit 102, and the PSE unit 106 receives the first control signal output by the control unit 108. The PD unit 104 receives the electric signal from the external Ethernet port 30 when the switch unit 110 is connected to the connection port 102 and the PD unit 104 receives the second control signal output by the control unit 108.

When the network 10 determines that the external Ethernet port 30 is a PD port according to the control unit 108 and the switch unit 110, the network port 10 may be set in the PSE mode by user. Then the network port 10 supplies power to the external Ethernet port 30 through the PSE unit 106.

When the network port 10 determines that the external Ethernet port 30 is a PSE port, the network port 10 may be set in the PD mode by user. Then the network port 10 receives the electronic signal from the external Ethernet port 30 through the PD unit 104. In at least one embodiment, the control unit 108 controls the switching of the switch unit 110 according to the type of the external Ethernet port 30, in order to protect the network port 10. This avoids a non-matching Ethernet port damaging the network port 10.

Figure 2:
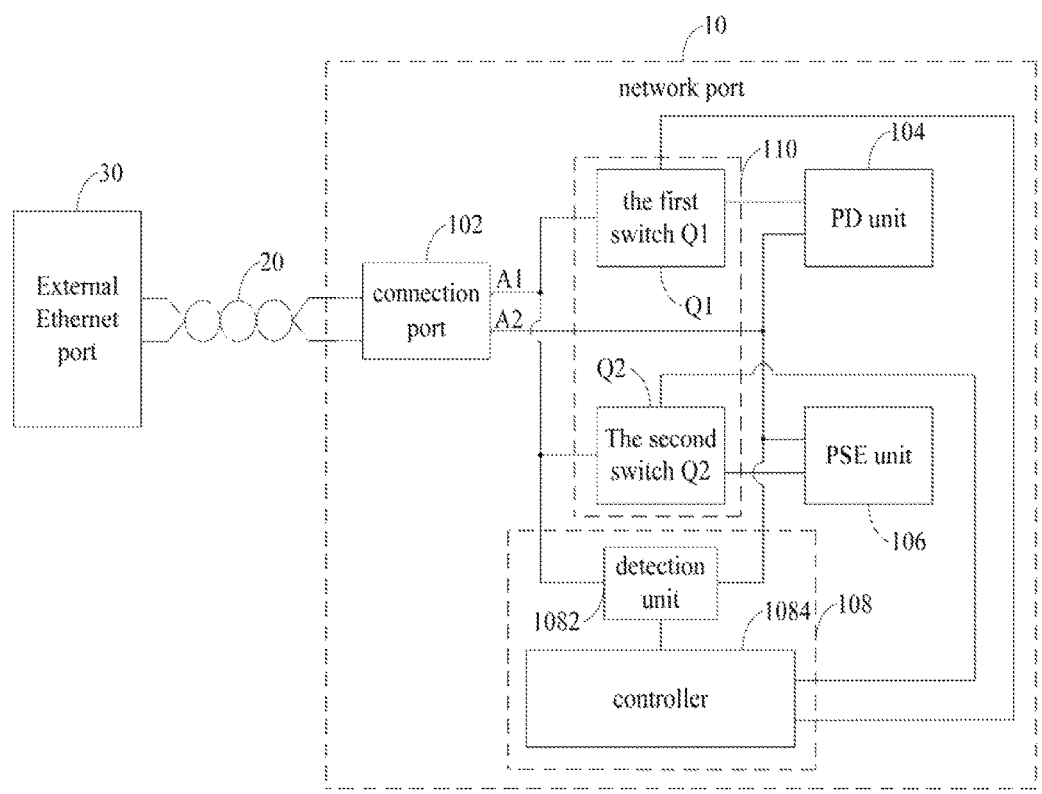
FIG. 2 is a diagram of a second embodiment of the network port.

FIG. 2 illustrates a second embodiment of the network port 10. In at least one embodiment, the connection port 102 comprises a first end A1 and a second end A2. The control unit 108 comprises a detection unit 1082 and a controller 1084. The detection unit 1082 is connected to the first end A1 and the second end A2. The detection unit 1082 detects the voltage of the first end A1 and the voltage of the second end A2 and sends the voltage values to the controller 1084. The controller 1084 outputs a determination signal according to the voltage of the first end A1 and the voltage of the second end A2.

The switch unit 110 comprises a first switch Q1 and a second switch Q2. The first switch Q1 comprises a first end, a second end, and a control end. The first end of the first switch Q1 is connected to the first end A1. The second end of the first switch Q1 is connected to one end of the PD unit 104. The control end of the first switch Q1 is connected to the controller 1084. Another end of the PD unit 104 is connected to the second end A2. The controller 1084 switches the first switch Q1 on or off according to the determination signal of the controller 1084, to select a connection to the PD unit 104 and the connection port 102.

The second switch Q2 comprises a first end, a second end, and a control end. The first end of the second switch Q2 is connected to the first end A1. The second end of the second switch Q2 is connected to one end of the PSE unit 106, and the control end of the second switch Q2 is connected to the controller 1084. Another end of the PSE unit 106 is connected to the second end A2. The controller 1084 switches the second switch Q2 on or off according to the determination signal output by the controller 1084, to select a connection to the PSE unit 106 and the connection port 102.

Figure 3:
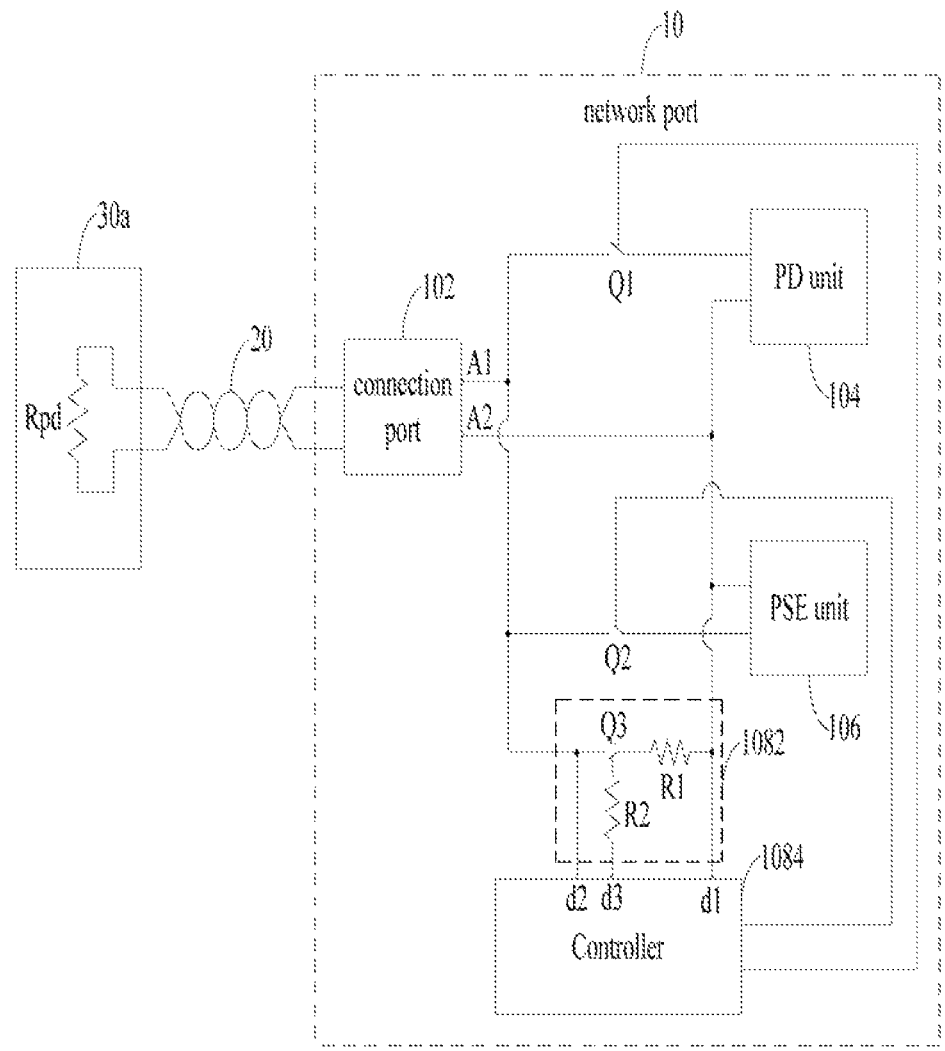
FIG. 3 is a circuit diagram of a first embodiment of the network port.

FIG. 3 is a circuit diagram of a first embodiment of the network port. In at least one embodiment, the external Ethernet 30a is a PD port. The controller 1084 comprises a first detect pin d1, a second detect pin d2, and a third detect pin d3. The detection unit 1082 comprises a first resistor R1, a second resistor R2, and a third switch Q3. One end of the first resistor R1 is connected to the second end A2 and the first detect pin d1.

The third switch Q3 comprises a first end, a second end, and a control end. The first end of the third switch Q3 are connected to another end of the first resistor R1, and the second end of the switch Q3 is connected to the first end A1. The second detect pin d2 and the control pin of the third switch Q3 is connected to one end of the second resistor R2. Another end of the second resistor R2 is connected to the third detect pin d3.

In at least one embodiment, if the external Ethernet port is a PD port, the external Ethernet port 30 may be equivalent to a load resistor Rpd. When the network port 10 is in a detect mode, the third switch Q3 is closed, and the first switch Q1 and the second switch Q2 are open. The controller 1084 sets the first detect pin d1 at voltage Vd1=a, and the third detect pin d3 at voltage Vd3=0. Thus the voltage Vd2 of the second detect pin d2 may be calculated from the following formula:

$$Vd2 = a*R2/[R2+(R1+Rpd)]$$

The external Ethernet port is a PD port when the controller 1084 determines that the voltage Vd2 of the second detect pin d2 satisfies the above formula. The controller 1084 closes the second switch Q2, and opens the first switch Q1 and the third switch Q3 to connect the PSE unit to the connection port 102. The PSE unit 106 outputs an electric signal to the external Ethernet port 30 when the network port 10 is in the PSE mode.

As described above, when the network port 10 is not connected to the external Ethernet port 30, the voltage Vd2 of the second detect pin d2 can be calculated from the following formula:

$$Vd2 = a*R2/(R1+R2)$$

That is, the network port 10 is not connected to the external Ethernet port 30 when the controller 1084 determines that the voltage Vd2 of the second detect pin d2 satisfies the above formula.

Figure 4:
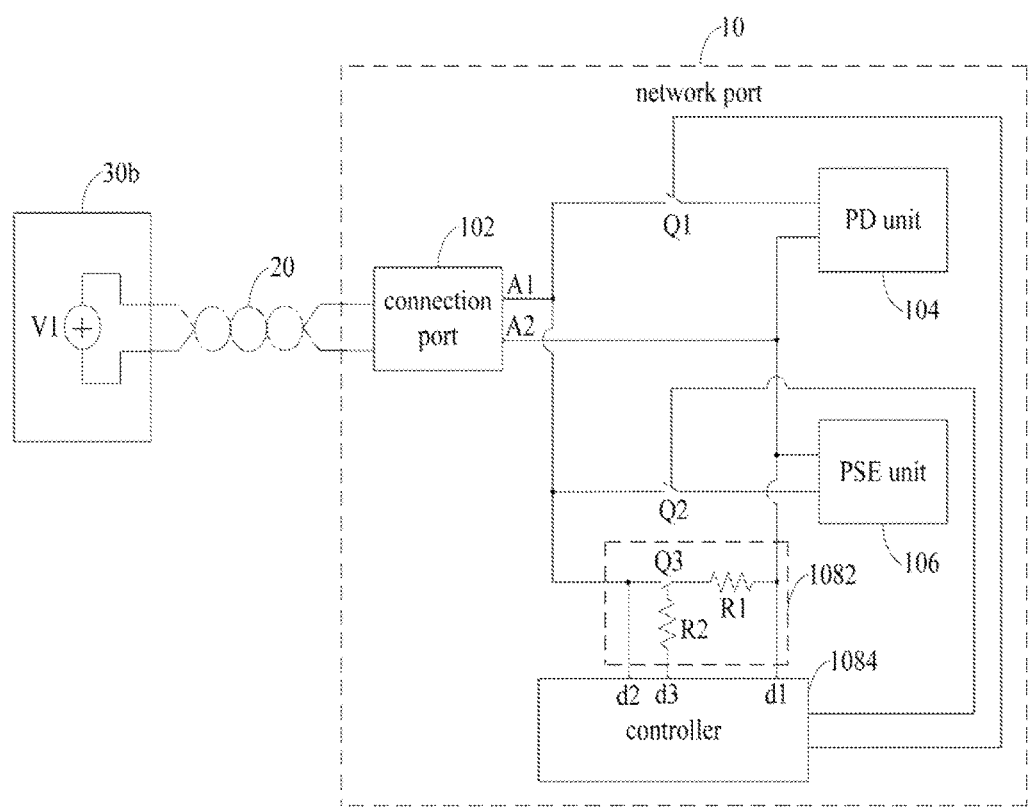
FIG. 4 is a circuit diagram of a second embodiment of the network port.

In at least one embodiment, the network port 10 is connected to the external Ethernet port 30b. If the external Ethernet port 30 is a PSE port, the external port 30b may be equivalent to a power V1, as shown in FIG. 4. When the network port 10 is in the detect mode, the third switch Q3 is closed, and the first switch and the second switch Q2 are open, and the controller 1084 detects the voltage of the first detect pin d2. If the controller 1084 determines that the voltage presented on first detect pin d1 is stable and gradually increases to the predetermined value, the external Ethernet port 30a is a PSE port.

The PD unit 104 is connected to the connection port 102 when the controller 1084 closes the first switch Q1 and opens the second switch Q2 and the third switch Q3. The PD unit receives the electric signal from the external Ethernet port 30a when the network port 10 is in the PD mode. In at least one embodiment, the external Ethernet port 30a is a PSE port when the voltage Vd1 of the first detect pin d1 as determined by the controller 1084, is greater than 2.8 V and less than or equal to 10 V, and the value increases at a rate of more than 1 V in 1 second.

In at least one embodiment, the PD unit 104 and the PSE unit 106 may be a PoE module implementing a PD and a PSE. The controller 1084 may be a signal processing chip, such as a FPGA, a PLD, a MCU, a DSP, a CPU, or the like. The first switch Q1, the second switch Q2 and the third switch Q3 can be a switch tube or the other module which is either on or off according to a control signal.

Figure 5:
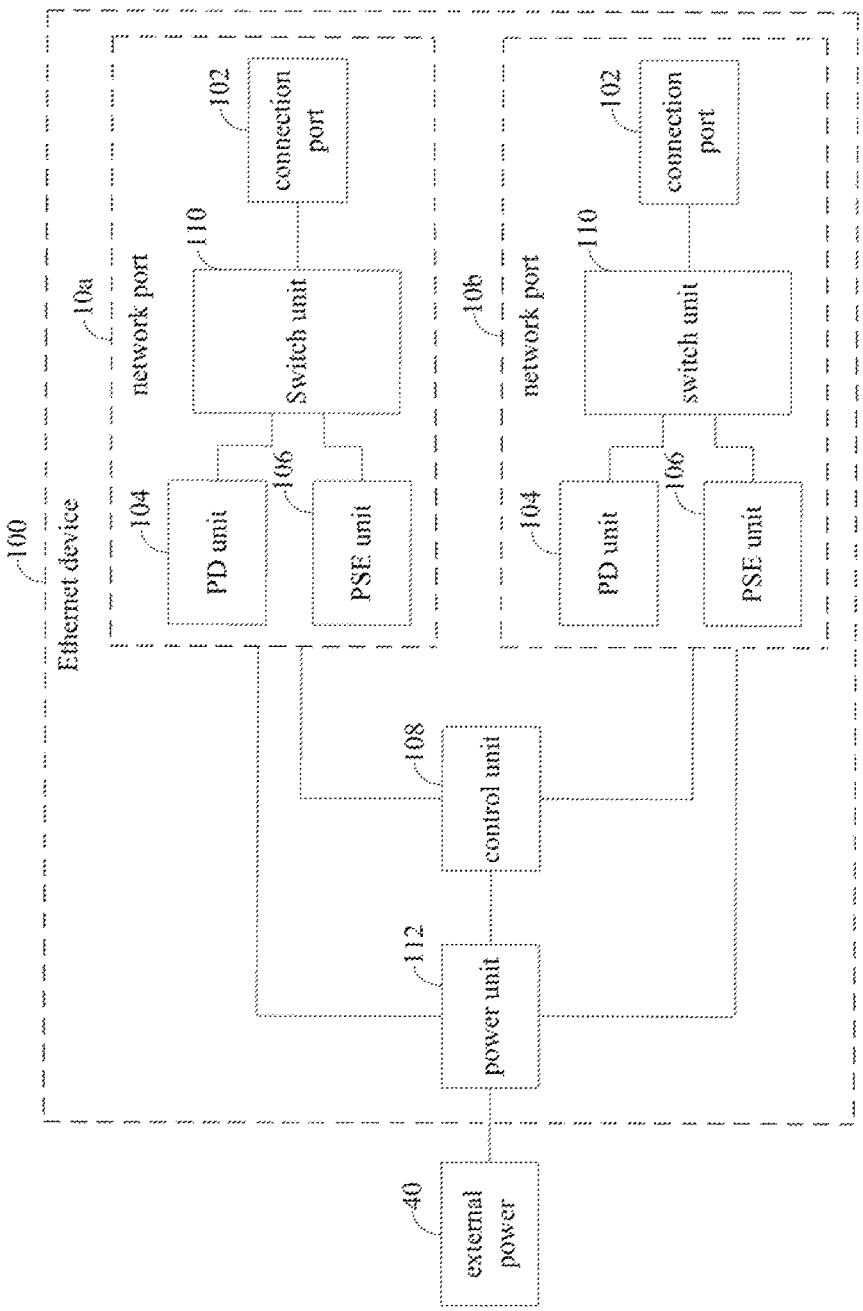
FIG. 5 is a diagram of a first embodiment of an Ethernet device.

FIG. 5 illustrates a first embodiment of an Ethernet device 100. In at least one embodiment, the Ethernet device 100 comprises multiple network ports 10a and 10b (two are shown as non-limiting examples) and a power unit 112. The power unit 112 receives an electric signal from the external power source 40 to supply power to the Ethernet device 100.

In at least one embodiment, each network port 10a, 10b is similar to the network port 10 shown in FIG. 1. The difference is that the multiple network ports 10a, 10b share the control unit 108. The control unit 108 determines the type of the external Ethernet port 30 which is connected to each network port 10a, 10b to output multiple determination signals correspondingly. The switch unit 110 of each network port 10a, 10b implements the switching according to the determination signals. For example, the switch unit 110 of the network port 10 can select a connection to the PSE unit 106 and the connection port 102 when the control unit 108 determines the external Ethernet port 30 connected to the network port 10a is a PD port. The switch unit 110 of the network port 10b can select a connection to the PD unit and the connection port 102 when the external Ethernet port 30 connected to the network port 10*b* is a PSE port. In the embodiment, each network port 10*a*, 10*b* may be the control unit 108.

In at least one embodiment, the power unit 112 is connected to the external power source 40. If the network port 10*a* is in the PSE mode and the network port 10*b* is in the PD mode, the network port 10*a* receives the electric signal from the power unit 112 and the network port 10*b* to improve the output rate of the network 10*a*. For example, the power unit 112 is connected to the external power source 40. The maximum output rate of the network port 10*a* is 30 W when the network port 10*a* is in the PSE mode and the network port 10*b* is not connected to the external Ethernet port 30. When the network port 10*a* is in the PSE mode and the network port 10*b* is in PD mode, the network port 10*b* continues receiving the electric signal from the external Ethernet port 30. Thus the maximum output rate of the network port 10*a* can be to 50 W.

In at least one embodiment, when the power unit 112 is disconnected to the external power source 40, the Ethernet device 100 receives the electric signal from the PSE port 106 connected to the Ethernet device 100 by one or by multiple network port 10*a*, 10*b* to supply power to the Ethernet device 100. The electric signal also prompts a supply of power to the PD port by other network port, to further promote the Ethernet device 100 receiving an electric signal from the external PSE Port, to supply power to the external PD port.

As described above, the network port and the Ethernet device integrate the PD and the PSE in a port, and switch between a PSE mode or a PD mode automatically according to the PSE device or the PD device, to avoid damaging the network port or Ethernet device because of a non-matching Ethernet port.

What is claimed is:

1. A network port comprising:
   a connection port, connected to an external Ethernet port by a network cable;
   a Powered Device (PD) unit;
   a Power Sourcing Equipment (PSE) unit configured to receive an electric signal from an external power source and to output the electric signal;
   a control unit configured to determine a type of the external Ethernet port and output a determination signal; and
   a switch unit connected to each of the connection port, the control unit, the PSE unit, and the PD unit, wherein the switch unit is configured to connect the PSE unit to the connection port or disconnect the PSE unit to the connection port according to the determination signal output by the control unit, and the switch unit is further configured to connect the PD unit to the connection port or disconnect the PD unit to the connection port according to the determination signal output by the control unit; wherein the connection port comprises:
   a first end;
   a second end;
   wherein the control unit comprises:
   a detection unit detecting the voltage of the first end of the connection port and the voltage of the second end of the connection port; and
   a controller determining the type of the external Ethernet port connected to the connection port and corresponding outputting the determination signals according to the voltage of the first end of the connection port and the voltage of the second end of the connection port.

2. The network port of claim 1, wherein the switch unit connects the PSE unit to the connection port and disconnects the PD unit to the connection port when the external Ethernet port is a PD port, wherein the switch unit connects the PD unit to the connection port and disconnects the PSE unit to the connection port when the external Ethernet port is a PSE port.

3. The network port of claim 1, further comprising a PSE mode and a PD mode, wherein the PSE unit determines whether the electric signal is output to the external Ethernet port or not according to the mode of the network port currently when the switch unit connects the PSE unit to the connection port; the PD unit determines whether the electric signal is received from the external Ethernet port or not according to the mode of the network port currently when the switch unit connects the PD unit to the connection port.

4. The network port of claim 3, wherein the PSE unit outputs the electric signal to the external Ethernet port instead of not outputting the electric signal to the external Ethernet port when the network port in the PSE mode and the switch unit connects the PSE unit to the connection port.

5. The network port of claim 3, wherein the PD unit receives the electric signal from the external Ethernet port instead of not receiving electric signal from the external Ethernet port when the network port is in the PD mode and the switch unit connects to the PD unit and the connection port.

6. The network port of claim 1, wherein the switch unit comprises:
   a first switch comprising a first end, a second end, and a control end, wherein the first end of the first switch is connected to the connection port, and the second end of the first switch is connected to the PSE unit, and the control end of the first switch is connected to the control unit, wherein the first switch is configured to determine whether the PSE unit connects to the connection port or not according to the determination signal output by the control unit; and
   a second switch, comprising a first end, a second end, and a control end, wherein the first end of the second switch is connected to the connection port, and the second end of the second witch is connected to the PD unit, and the control end of the second switch is connected to the control unit; wherein the second switch is configured to determine whether the PD unit connects to the connection port or not according to the determination signal of the control unit.

7. The network port of claim 1, wherein the controller comprises:
   a first detect pin;
   a second detect pin;
   a third detect pin;
   wherein the detection unit comprises:
   a first resistor with one end connected to the first end of the connection port and the first detect pin of the controller;
   a third switch, comprising a first end, a second end, a control end, wherein the first end of the third switch is connected to another end of the first resistor, and the second end of the third switch is connected to the second end of the connection port and the second end of the controller; and
   a second resistor, wherein one end of the second resistor is connected to the control end of the third switch, and another end of the second resistor is connected to the third detect pin of the controller, wherein the controller receives the voltage of the first end of the connection port and the voltage of the second end of the connection port by the first detect pin and the second detect pin of the controller.

8. An Ethernet device comprising:
a power unit, receiving electric signal of an external power source to power supply to the Ethernet device;
multiple network ports, wherein each network port comprises a connection port, a PD unit, and a PSE unit; and
a control unit connected to the multiple network ports, wherein the control unit is configured to determine the type of external Ethernet port connected to the each network port to output the multiple determination signals correspondingly;
wherein each network port further comprises a switch unit, wherein the switch unit is configured to connect the PSE unit to the connection port of the corresponding network port or disconnect the PSE unit to the connection port of corresponding network port according to the determination signal output by the control unit, and switch unit is further configured to connect the PD unit to the connection port of the corresponding network port or disconnect the PD unit to the connection port of corresponding network port according to the determination signal output by the control unit.

9. The Ethernet device of claim 8, wherein each network port further comprises a PSE mode and a PD mode, when the switch unit connects the PSE unit to the connection port of the corresponding network port, the PSE unit determines whether outputs the electric signal to the external Ethernet port or not according to the mode of the network port currently, when the switch unit connects PD unit to the connection port of the corresponding network port, the PD unit determines whether receives electric signal from the external Ethernet port or not according to the mode of the network port currently.

10. The Ethernet device of claim 9, wherein the PSE unit outputs the electric signal to the external Ethernet port instead of not outputting the electric signal to the external Ethernet port when the network port in the PSE mode and the switch unit connects the PSE unit to the connection port of corresponding the network port.

11. The Ethernet device of claim 9, wherein the PD unit receives the electric signal from the external Ethernet port instead of not receiving the electric signal from the external Ethernet port when the network port is in the PD mode and the switch unit connects the PD unit to the connection port of the corresponding network port.

12. The Ethernet device of claim 8, wherein the PD unit further receives the electric signal from the external Ethernet port to power supplies to the Ethernet device when the power unit does not receive the electric signal of the external power.

13. The Ethernet device of claim 8, wherein the multiple network port comprises a first network port and a second network port, wherein the PSE unit of the second network port further receives electric signal from the PD unit of the first network port and power unit to output the electric signal in order to improve the output rate of the PSE when the PD unit of the first network port receives the electric signal from the external Ethernet port.

14. The Ethernet device of claim 8, wherein the multiple network port comprises a first network port and a second network port, wherein the PSE unit of the second network port further receives the electric signal from the PD unit of the first network port to output the electric signal when the PD unit of the first network port receives the electric signal from the external Ethernet port and the power unit does not receive the electric signal from the external power.

15. The network port of claim 1, further comprising a PSE enable pin and a PD enable pin; wherein the control unit determines whether the network port is switched to the PSE unit or to the PD unit or not by reading information of the PSE enable pin and the PD enable pin.

16. The Ethernet device of claim 8, wherein each network port further comprising a PSE enable pin; wherein the control unit determines whether the network port is switched to the PSE unit or to the PD unit or not by reading information of the PSE enable pin and the PD enable pin.

* * * * *